United States Patent [19]
Melkuti

[11] Patent Number: 5,454,531
[45] Date of Patent: Oct. 3, 1995

[54] DUCTED PROPELLER AIRCRAFT (V/STOL)

[76] Inventor: Attila Melkuti, 32148 Shirey Rd., Escondido, Calif. 92026

[21] Appl. No.: 47,457

[22] Filed: Apr. 19, 1993

[51] Int. Cl.⁶ .............................. B64C 29/00; B64C 39/12
[52] U.S. Cl. .................... 244/12.6; 244/45 A; 244/23 B
[58] Field of Search ............................. 244/12.2, 12.5, 244/12.6, 23 B, 23 D, 45 A

[56] References Cited

U.S. PATENT DOCUMENTS

| | | | |
|---|---|---|---|
| 2,461,435 | 2/1949 | Neumann et al. | 244/12.5 |
| 2,828,929 | 4/1958 | Lippisch | 244/23 |
| 2,879,014 | 3/1959 | Smith et al. | 244/12.5 |
| 2,918,230 | 12/1959 | Lippisch | 244/23 |
| 2,932,468 | 4/1960 | Kappus | 244/23 |
| 2,968,453 | 1/1961 | Bright | 244/12.5 |
| 3,002,709 | 10/1961 | Cochran | 244/12.2 |
| 3,081,597 | 3/1963 | Kosin et al. | 244/23 D |
| 3,082,977 | 3/1963 | Arlin | 244/12.2 |
| 3,100,377 | 8/1963 | Kosin et al. | 244/23 D |
| 3,388,878 | 6/1968 | Peterson et al. | 244/23 B |
| 4,125,232 | 11/1978 | MacLean et al. | 244/12.3 |
| 4,335,537 | 6/1982 | Walker | 244/8 |
| 4,768,737 | 9/1988 | Broadley | 244/23 B |
| 4,828,203 | 5/1989 | Clifton et al. | 244/23 B |
| 5,026,002 | 6/1991 | Yarrington | 244/23 B |
| 5,039,031 | 8/1991 | Valverde | 244/12.2 |
| 5,065,143 | 11/1991 | Bucher | 244/12.2 |

FOREIGN PATENT DOCUMENTS

| | | | |
|---|---|---|---|
| 747772 | 12/1966 | Canada | 244/12.5 |
| 1210698 | 12/1958 | France | 244/12.5 |
| 157891 | 7/1969 | France | 244/12.5 |
| 3735918 | 9/1988 | Germany | 244/12.5 |

OTHER PUBLICATIONS

Interavia "Short or Vertical Take–Off and Landing" Jan. 1961 pp. 75–96.

*Primary Examiner*—Andres Kashnikow
*Assistant Examiner*—Virna Lissi Mojica
*Attorney, Agent, or Firm*—Brown, Martin Haller & McClain

[57] ABSTRACT

The aircraft incorporates a primary and two control ducted propeller assemblies. The propellers are interconnected for rotation by a single engine. Each propeller assembly is inclined in horizontal flight and has two groups of louvers. When the groups of louvers in a propeller assembly are set to divert air horizontally in opposed directions, reduced vertical thrust is realized. In this manner, pitch and roll may be controlled in vertical flight. Vanes on the control ducts produce differential horizontal thrust to control yaw in the vertical mode. In horizontal flight, all groups of louvers are set to direct the flow aft to produce thrust for high speed forward flight.

10 Claims, 6 Drawing Sheets

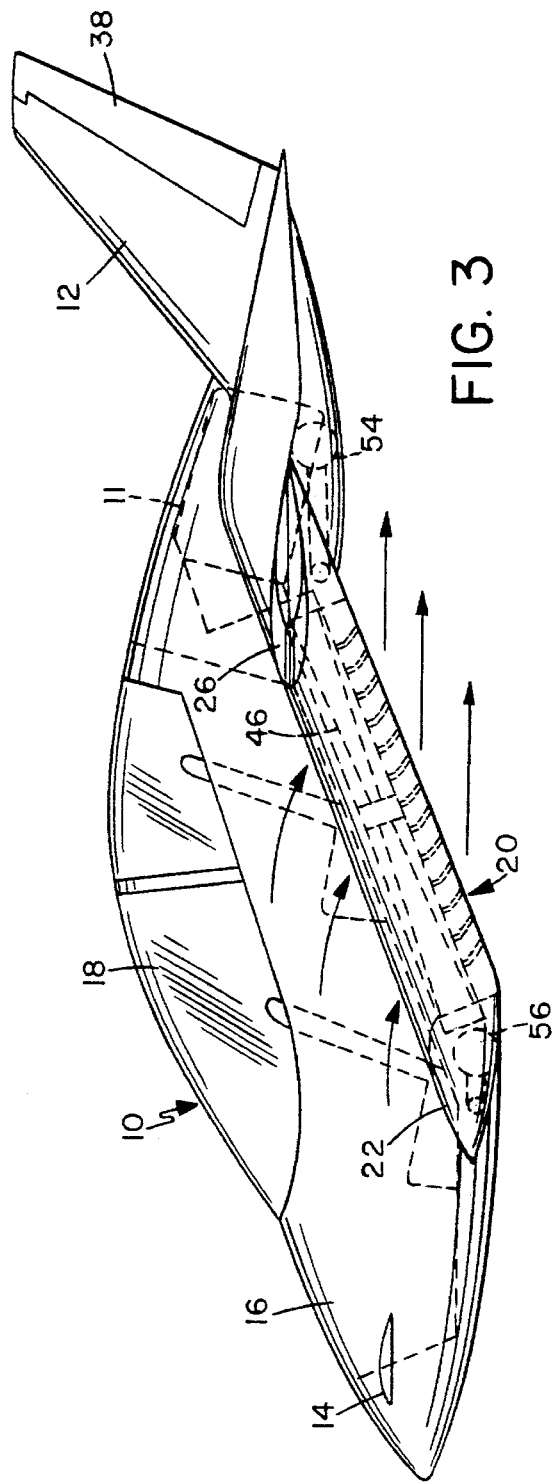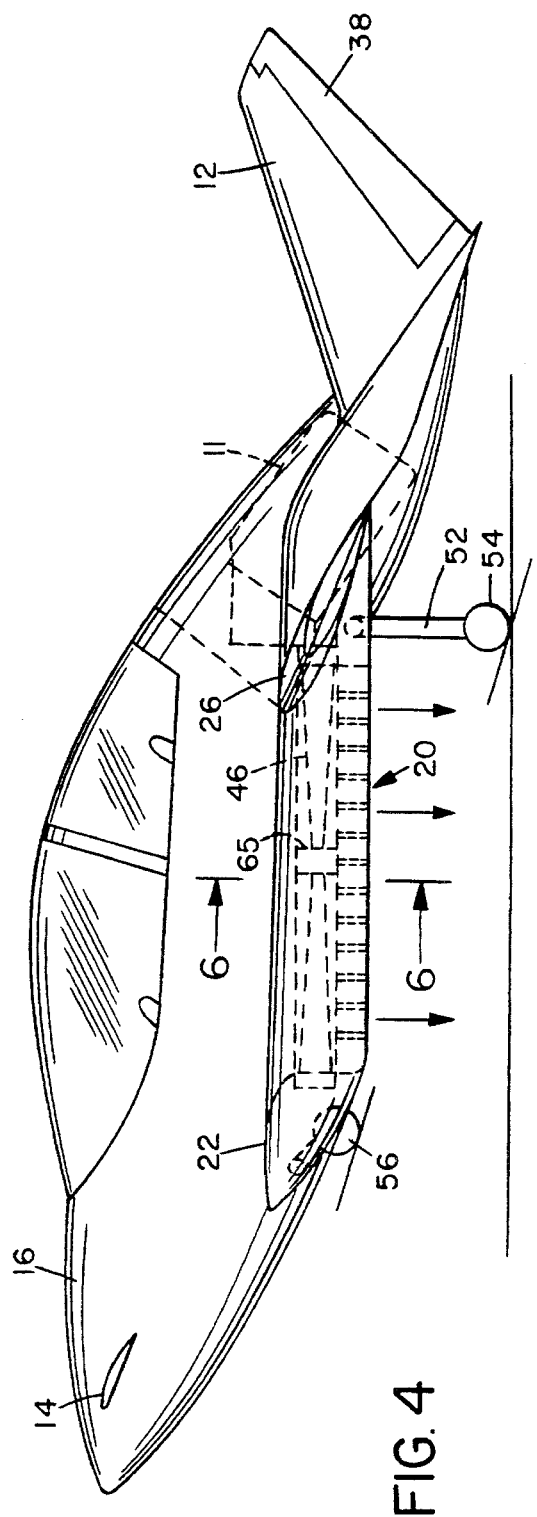

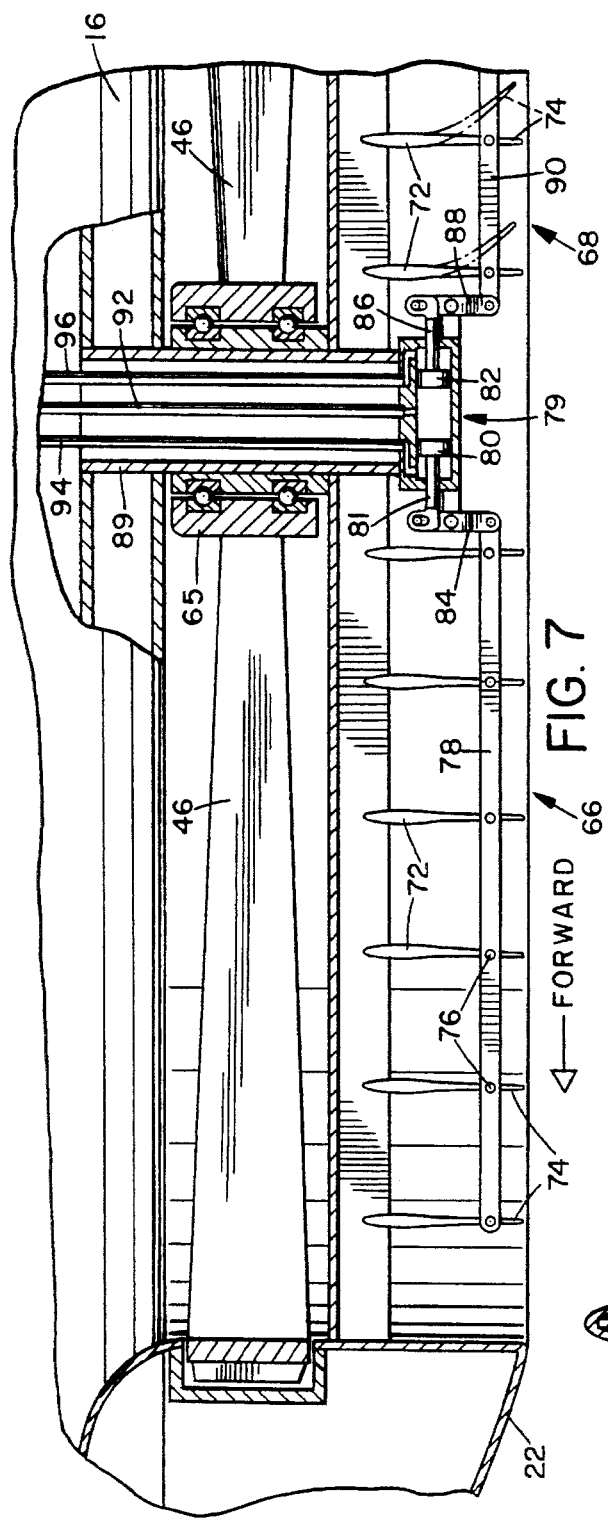
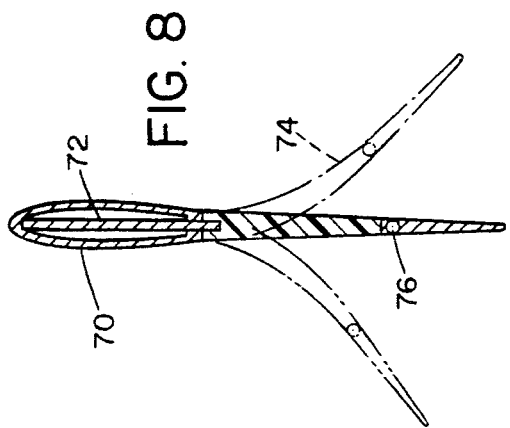

5,454,531

DUCTED PROPELLER AIRCRAFT (V/STOL)

BACKGROUND OF THE INVENTION

Many designs have addressed the difficult challenge of obtaining vertical or short takeoff or landing in fixed wing aircraft with high-speed cruise capability. The designs have included two separate power sources (one for vertical thrust and one for horizontal) (see U.S. Pat. Nos. 4,469,294; 3,083,935 and 3,388,878); ducted fans mounted in the fixed wings which rotate from horizontal to vertical (see U.S. Pat. No. 3,335,977); diverting jet engine exhaust turbo fans mounted above fixed wings and transitioning exhaust, through ducting from vertical to horizontal (see U.S. Pat. No. 3,972,490) and the numerous tilt wings and tilt engine concepts configured from the late 1930s to today.

Other prior designs have driven ducted fans or ducted propellers from turbo-prop or pure-jet engines by venting the exhaust gases to turbine blades attached to the outer edges of the fan or propeller assemblies as in U.S. Pat. No. 3,972,490. Previous patents also have used mechanical drives for the ducted fans or ducted propellers, which entailed long drive shafts (and even belt drives) with complex gear box assemblies (see U.S. Pat. No. 4,469,294.)

All of these embodiments involve at least one of the three most troublesome aspects of V/STOL aircraft designs. They may involve:

1) Cumbersome, and therefore heavy, mechanisms for moving massive structures such as wings or ducted fan assemblies; or 2) Sacrificing aerodynamic smoothness, thereby creating unacceptable drag; or 3) Multiple power plants or complex drive trains, thus increasing weight and lowering performance.

The goal of the present invention is to avoid all of these previously mentioned troublesome elements of V/STOL designs while maintaining good performance during horizontal flight (the ultimate intended configuration of all V/STOL aircraft.)

SUMMARY OF THE INVENTION

The exemplary embodiment of this invention involves a fixed wing airborne vehicle capable of vertical and short takeoff or landing commonly referred to as a V/STOL aircraft. Specifically, this invention relates to V/STOL aircraft wherein ducted propeller assemblies in the fuselage and wing sections of the aircraft are the sole source of thrust for the aircraft in both vertical and horizontal flight. As used herein, the term aircraft includes any airborne vehicle.

In the exemplary embodiment, the aircraft of the invention utilizes a single, turbo shaft engine mechanically driving three ducted propeller assemblies mounted in a fixed position within the airframe. In vertical or short takeoff flight, roll, pitch and yaw are controlled by moveable louvers in the airstream of the ducted propellers' propulsion assembly. During conventional takeoff, horizontal flight and conventional landing, the louvers may be disabled. In the conventional configuration, roll, pitch and yaw controlled through conventional aerodynamic surface adjustments of ailerons, stabilizers, rudders and elevators.

BRIEF DESCRIPTION OF THE DRAWINGS

FIG. 3 is a side view with partial cutaway showing relative location and angle from horizontal of the fuselage and ducted propeller thrust/lift assembly during typical horizontal flight of the aircraft according to the invention.

FIG. 4 is a side view with partial cutaway showing relative location and angle of the fuselage and ducted propeller thrust/lift assembly in reference to the ground during initial stages of vertical takeoff and in reference to the horizon during vertical flight of the aircraft.

FIG. 7 is a cutaway cross sectional view of the primary ducted propeller assembly taken on line 7—7 of FIG. 2 showing the respective louvers control hydraulic drive piston assembly of the present invention.

FIG. 8 is a cross sectional view of one louver blade showing the relative motion of the moveable portion of the louver under flight command control of the present invention.

DESCRIPTION OF THE PREFERRED EMBODIMENT

Figure 1:
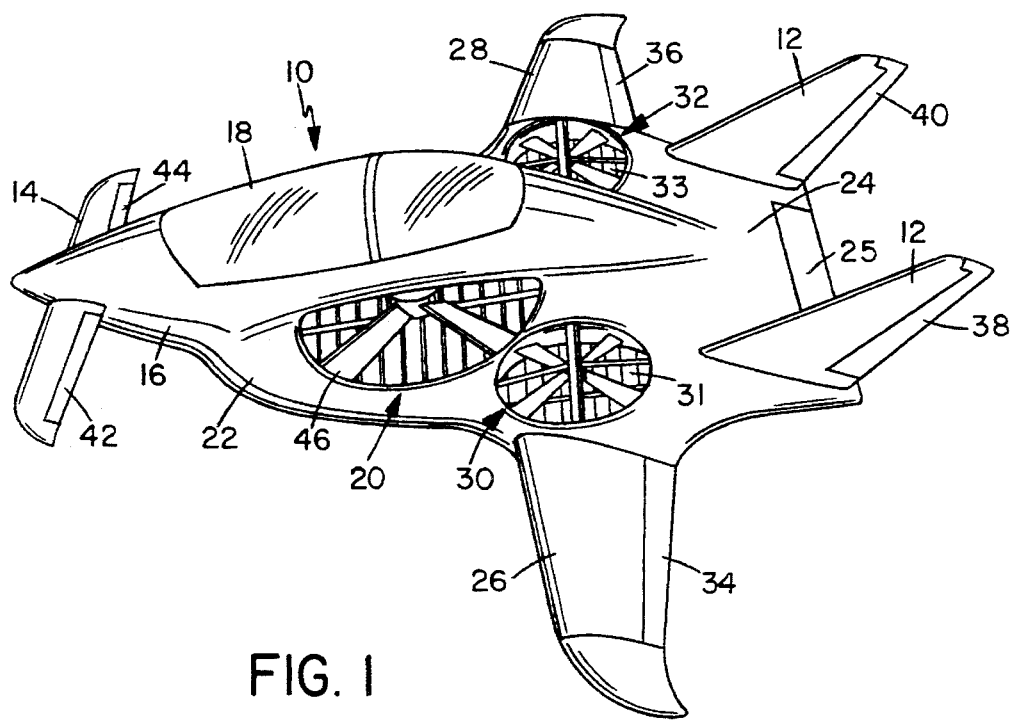
FIG. 1 is a perspective view of an aircraft in accordance with the present invention.
Figure 2:
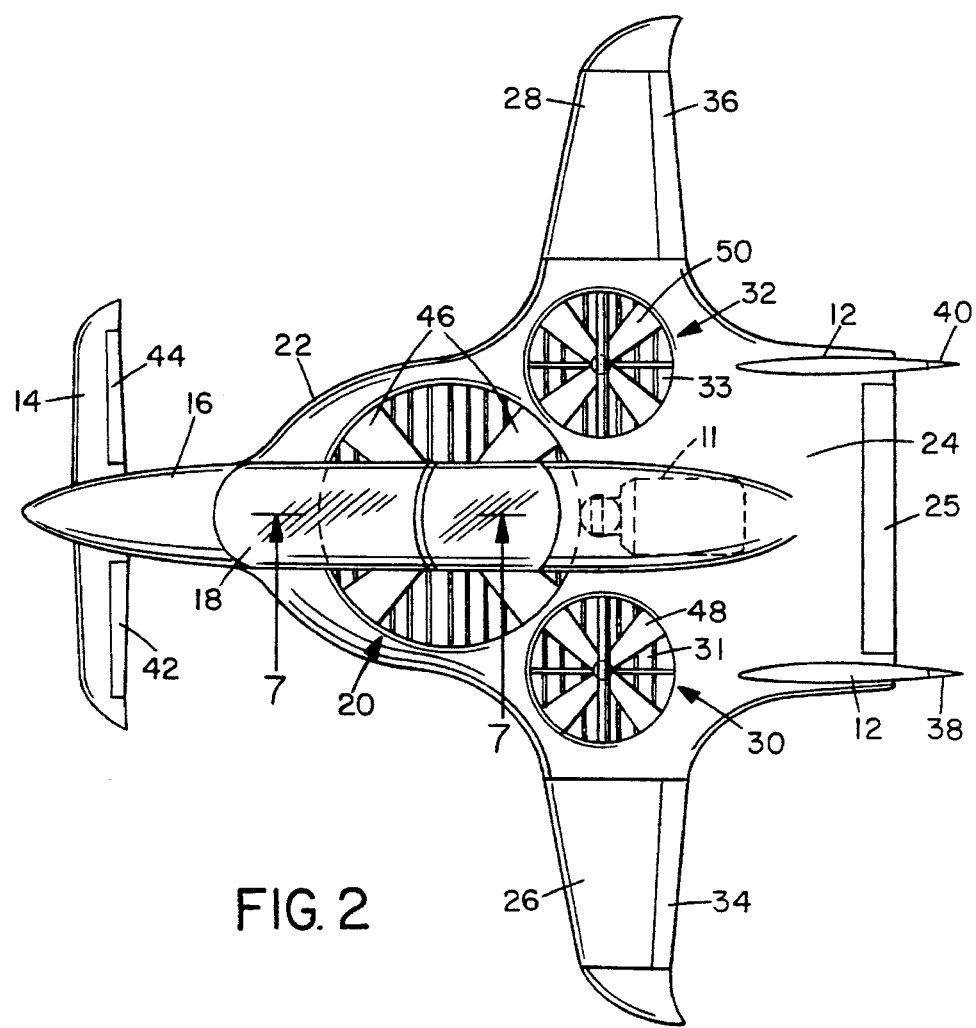
FIG. 2 is a top plan view showing the relative locations of ducted propeller thrust/lift assembly, wing section and fuselage of the aircraft.

Referring to the drawings, and particularly the FIGS. 1 through 4, the aircraft 10 of the invention is illustrated. As used herein the term aircraft is meant to include any airborne vehicle.

In the preferred embodiment, the aircraft takes the form of a single engine 11 turbo shaft powered aircraft incorporating twin vertical stabilizers 12 and a forward canard lifting surface 14.

Aircraft fuselage 16 houses a tandem cockpit with canopy 18. The fuselage and cockpit bridges over a primary ducted propeller assembly 20 housed in wing section 22. The cockpit bridges directly over the axis of the propeller and tapers to a minimum cross-section on the portion adjacent the propeller assembly to maximize air flow through the duct. Wing section 22 extends through an aft extension 24 and mounts an elevator 25. The vertical stabilizers 12 mount rudders 38 and 40.

Spanwise the wing section 22 terminates in wing extensions 26 and 28 which incorporate ailerons 34 and 36. Mounted in the wing sections are left and right control ducted propeller assemblies 30 and 32.

The forward canard 14 has trim tabs 42 and 44.

As used herein the term propeller is intended to include any rotating blade mounted from a central hub and operating at an angle of attack to the relative movement of air past the propeller. In the preferred embodiment the propeller takes the form of a four-bladed propellers having curved lifting surfaces. In the case of the propeller assembly 20 a hub 65 mounts four blades 46. In the case of propeller assembly 30 a hub 31 mounts four blades 48, and in the case of propeller assembly 32 a hub 33 mounts four blades 50.

Referring to FIG. 3 there the aircraft is illustrated in horizontal flight. As used herein, the term aircraft related horizontal is intended to refer to a horizontal line drawn through the aircraft in this flight mode.

As will appear in FIG. 3, in the horizontal flight mode, the ducted propeller assembly 20 is deployed at an angle to the incoming air stream. In the preferred embodiment, the angle for flight relative to aircraft-related horizontal approximates 22 degrees. (The plane of rotation of the propeller is +22 degrees from the aircraft related horizontal.) Therefore, the air exiting the primary propeller assembly already has a substantial horizontal component due to the flight configuration of the aircraft itself.

The exiting air is redirected to fully horizontal by a series of louvers. The louvers (shown in phantom in FIG. 3) may be controlled to redirect the air exiting the fan in two principal modes, the vertical flight mode and the horizontal flight mode. In the horizontal flight mode, all of the louvers redirect the air in the same direction (in this case, horizontal and aft of the aircraft) resulting in substantial forward thrust.

The wing, in the horizontal flight mode, as will be most clearly appreciated from the end-on view of wing extension 26 in FIG. 3 operates at a small (approximately 1 degree) positive angle of attack.

FIG. 4 shows the operation of the aircraft in the vertical takeoff mode. Unpowered, the aircraft rests on the ground on a main gear 52 and wheels 54 in the rearward portion of the aircraft and a nose wheel 56.

After the engine 11 is started and the propellers within the propeller assemblies rotate, thrust is produced. The louvers are arranged so that the thrust has a substantial vertical component. This results in the forward portion of the aircraft lifting off the ground first, and rotating around the main gear, until the axis of the primary propeller assembly is vertical. This results in all of the thrust from the primary propeller assembly and the control propeller assemblies in exiting the propeller assemblies in a vertical direction, and therefore results in the use of all of the engine power to lift the aircraft vertically.

Figure 5:
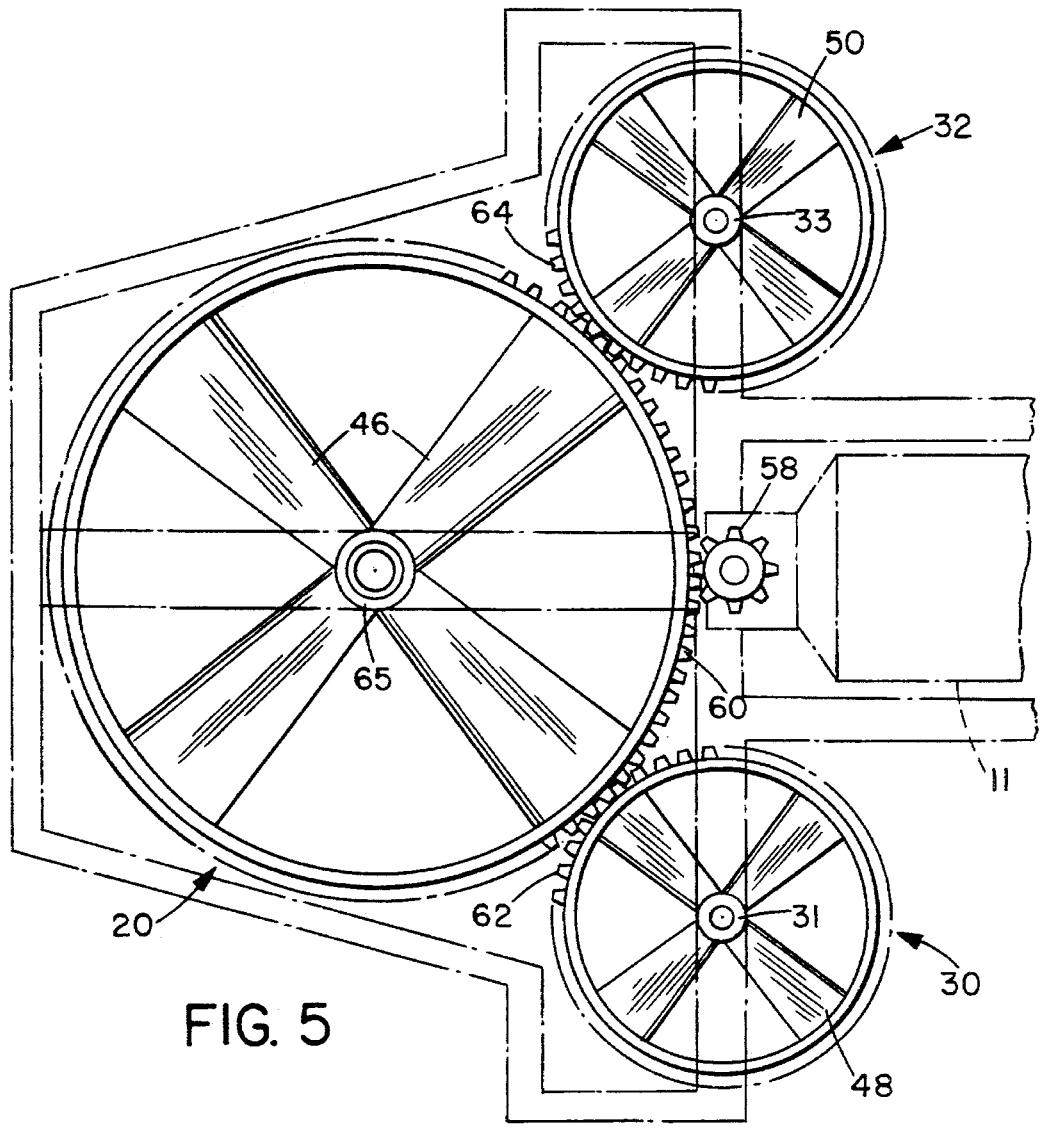
FIG. 5 is a top view of the ducted propeller thrust/lift assembly showing the relative locations of the engine, primary ducted propeller assembly and control ducted propeller assemblies with respective ring gears and drive gear of the present invention.

Referring to FIG. 5 the primary propeller assembly 20 and control propeller assemblies 30 and 32 are shown to be coupled to a motor output gear 58. The motor output gear 58 directly drives a ring gear 60 encircling the blades 46 of the primary propeller assembly. The ring gear is joined to the blades 46 at the outer ends thereof. Ring gear 60 in turn drives ring gears 62 and 64 on the control propeller assemblies 30 and 32 respectively. Accordingly, all of the propeller assemblies rotate together.

In the preferred embodiment, all of the propellers are of fixed pitch variety. This greatly reduces the complexity of construction and cost of the aircraft.

Since the conventional control surfaces used in horizontal flight are ineffectual during vertical takeoff, and since there is no way to vary the respective thrust of the control propeller assemblies and primary propeller assembly, all of the control of the aircraft during vertical, and early transition flight is through varying the direction of the air flow exiting each of the propeller assemblies via louver control and, to a lesser degree, for overall changes varying engine power.)

Figure 6:
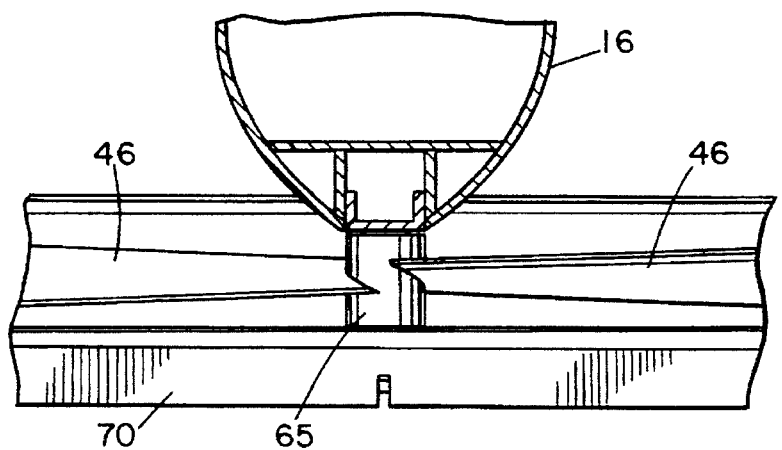
FIG. 6 is a cutaway cross sectional view of the fuselage at the point of bridging the primary ducted propeller assembly of the present invention taken of line 6—6 of FIG. 4.

FIG. 6 illustrates the manner in which propeller blades are secured to the central hub 65. In this case, the propeller blades are the blades of 46 of the primary propeller assembly 20.

FIGS. 7 and 8 illustrate the operation of the air flow louvers utilized to redirect the propeller thrust in all of the propeller assemblies. The louvers are mounted in the air stream immediately at the output of the propeller assembly. Each propeller assembly has a pair of louver assemblies; in this case louver assembly 66 controls the group of louvers forward of the hub of the primary propeller assembly and louver assembly 68 controls the group of louvers aft of the hub. Each louver assembly controls a plurality of flexible louvers 70, which have a rigid core 72 and a flexible aft extension 74 encasing a reinforcing rod 76. Reinforcing rods 76 are received on control rods 78 (see FIG. 7.) The shape of the louvers is altered by operation of the piston assembly 79 which incorporates a piston 80 for the forward louvers and piston 82 for the aft louvers. Piston 80 is connected through a piston rod 81 to a rocker arm 84 so that forward motion of the rod 81 results in aft motion of the control rod 78. Piston rod 86, connected to piston 82, is received on rocker arm 88 so that forward motion of the piston rod 86 results in aft motion of the control rod 90.

Each piston assembly is supplied by a series of hydraulic lines including a central line 92, forward line 94 and aft line 96, which extend through a fixed shaft 89 on which hub 65 is rotatably mounted. Each line may either supply hydraulic pressure or exhaust excess fluid as selected by a control valve. The control valve is described in conjunction with the discussion of FIGS. 10 through 12. It will be appreciated that if line 92 supplies pressure and lines 94 and 96 are set to exhaust fluid, then piston 80 will move forward and piston 82 aft. In the opposite instance, if the line 92 is permitted to exhaust fluid and the lines 94 and 96 pressurized, the pistons 80 and 82 will move toward one another. Forward movement of the piston 82 will result in aft movement of the control rod 90 and aft movement of the piston 80 will result in forward movement of the control rod 78. This would cause the louvers 72 in the aft louver group 68 to be bent as illustrated in phantom lines. The air flow over the louvers would therefore be deflected aft. Since the louvers in the forward group would be deflected forward, two substantial equal and opposite horizontal components will be developed. The net result of the horizontal thrust cancellation is less vertical thrust from the primary propeller assembly. If line 96 is pressurized, line 92 sealed to prevent the exhaust of hydraulic fluid and line 94 opened for exhaust, then both the pistons 82 and 80 will move forward, which will result in all of the louvers having their trailing edges bent in the aft direction so that all of the air exiting the primary and control propeller assembly will work in unison to convert the generally vertical thrust of the propeller assemblies to horizontal thrust for use during the horizontal flight mode as illustrated in FIG. 3. The louvers 31 of propeller assembly 30 and louvers 33 of propeller assembly 32 operate in a similar manner.

Figure 10:
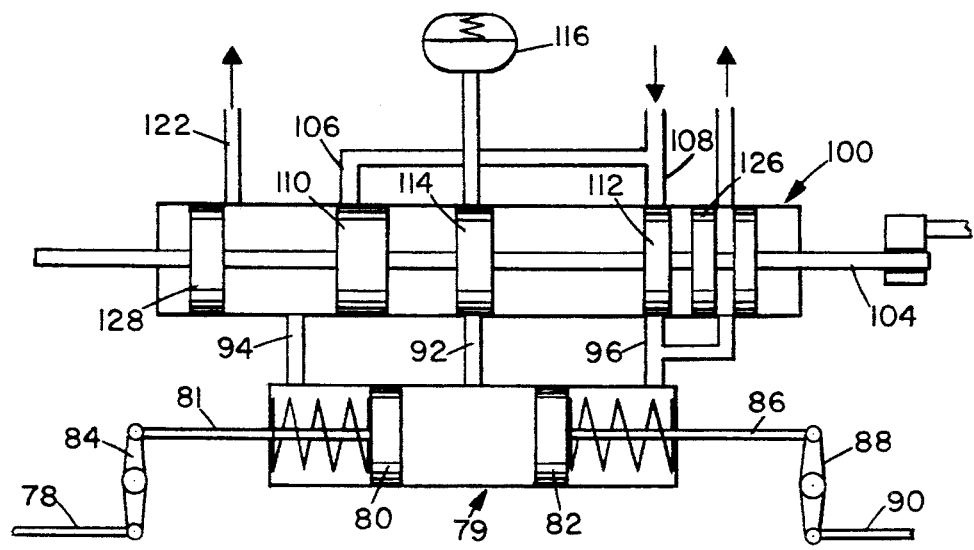
FIG. 10 is a schematic representation of the interaction of the hydraulic valve and piston controls for louvers of the primary ducted propeller assembly during vertical flight.
Figure 11:
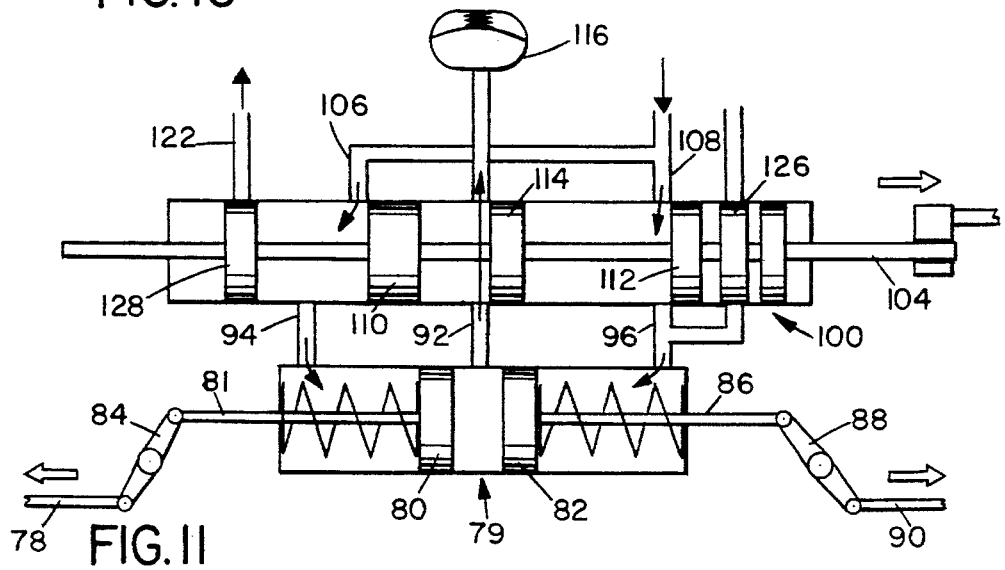
FIG. 11 is a schematic representation of the action of the hydraulic valve for one of the control propeller assemblies in commencing a roll response.
Figure 12:
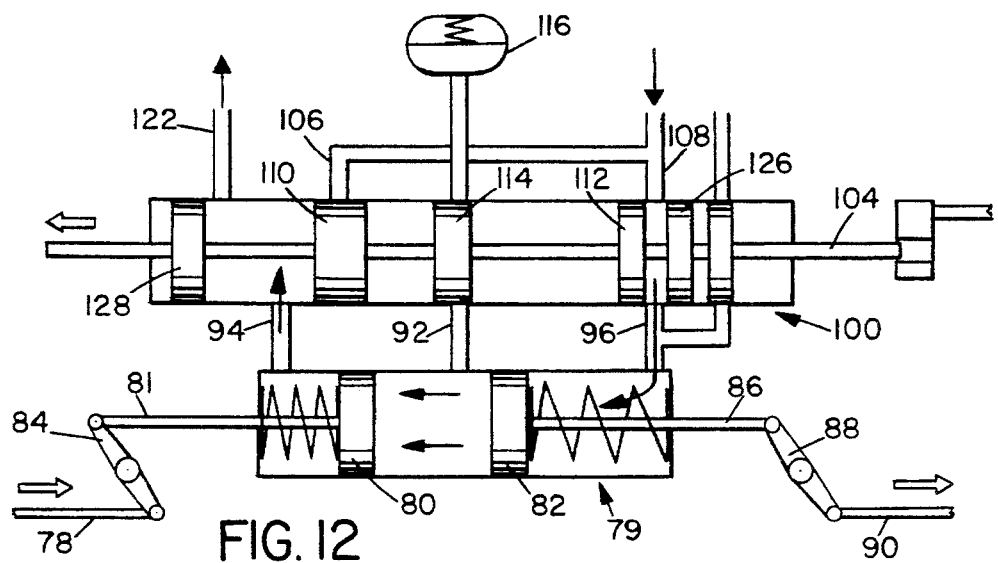
FIG. 12 is a schematic representation of each of the control valves in commencing louver position during horizontal flight.

FIGS. 10 through 12 illustrate the operation of the control valve in cooperation with the typical piston assembly 79. The control valve 100 incorporates a series of control pistons which modulate the distribution of pressurized hydraulic fluid on the several lines illustrated. A control rod 104 is connected to the flight controls of the aircraft. In the case of the primary propeller assembly, the control rod 104 is connected to respond to movement of the control wheel or stick corresponding to that calling for movement of the elevators. In the neutral position of the control wheel or stick, control rod 104 is in the position shown in FIG. 10. Hydraulic pressure is present in lines 106 and 108, but is blocked by the control pistons 110 and 112. Control piston 114 blocks the return of any pressurized fluid to store it in the accumulator 116 to cause equal and opposite deflection of the air by the forward and aft louver sections. The control rod 104 is moved to the right as in FIG. 11, which allows hydraulic fluid to flow into the outer ends of the piston assembly 79, causing the pistons to move toward one another and thereby causing the control rods 78 and 90 to move away from one another and to cause the air in the forward section to be deflected toward the front of the aircraft and the air in the aft section of the propeller assembly to be directed toward the rear of the aircraft, resulting in reduced vertical thrust of the propeller assembly. When the pistons move toward one another, the control piston 114 allows the hydraulic fluid to exit from the piston assembly and into the accumulator 116.

FIG. 12 illustrates the configuration when it is desired to move both of the louver assemblies in unison to redirect all the thrust to the horizontal direction. The control rod 104 is moved to the left, which allows hydraulic fluid to flow in line 108 and into the right hand volume of the piston assembly 79, resulting in movement of the piston 82 to the left. However, control piston 114 blocks any movement of hydraulic fluid in the accumulator 116 and therefore the hydraulic fluid (pressure) (being incompressible) causes the left hand piston 80 to move to the left and the hydraulic fluid to exit the piston assembly 79 on lines 94 through the control valve 100 and outline 122 to the hydraulic source (not shown.)

It will be appreciated that as applied to the control propeller assemblies 30 and 32, when a control valve like typical value 100 illustrated in FIGS. 10 through 12 is operated to redirect the propeller thrust in equal and opposite horizontal directions will cause the vertical thrust from each of the control propeller assemblies to be reduced, causing the nose of the aircraft to pitch up. To pitch down the nose of the aircraft, the thrust will be reduced in the same manner on the primary propeller assembly 20. The roll control in the vertical flight mode will be achieved by reducing the thrust in the same manner on the left control propeller assembly 30, or right control propeller assembly 32.

Figure 9:
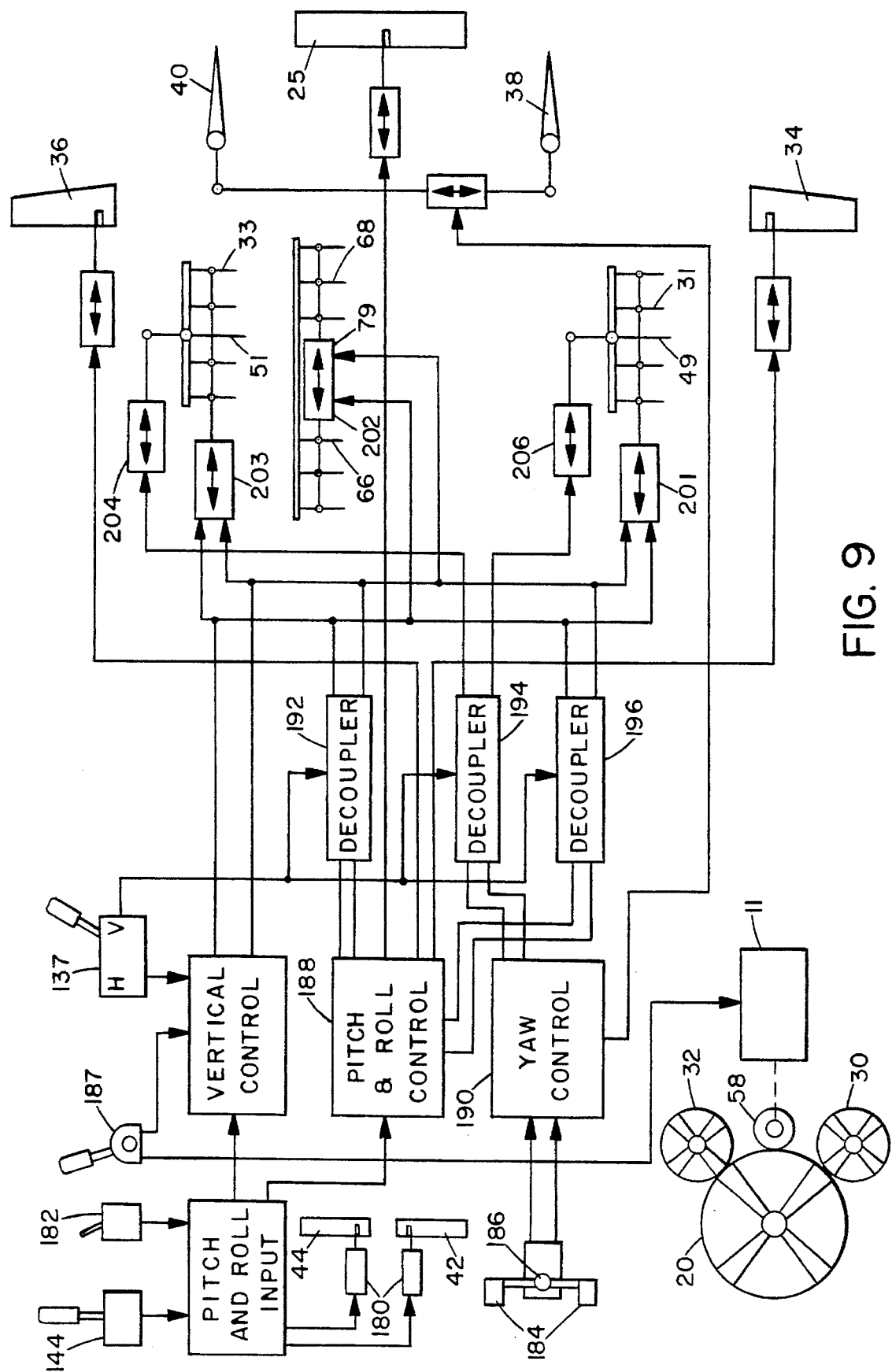
FIG. 9 is a schematic/block diagram depiction of the various flight control elements and relative interaction during vertical flight and during horizontal flight of the present invention.

FIG. 9 illustrates the flight control system in schematic form. The horizontal flight controls may comprise a conventional cable-pulley hydraulic or fly-by-wire system for 3 axis control. Pitch trim is accomplished by electric actuators 180 operating the canard surfaces 42 and 44. A three position trim switch 182 selects up down or off. A conventional stick control is coupled to the elevator 25 and ailerons 34 and 36 through forward flight control system 188. Rudder pedals 184 control twin rudders 38 and 40 through yaw control system 190. The conventional control surfaces are active in all flight modes. For horizontal flight, the vertical flight controls are decoupled. Decoupling may be accomplished by solenoid reactivation of mechanical links between the 3 axis movements 1) left-right movement of the control stick, 2) fore-aft movement of the control stick and 3) left-right rotation of the rudder pivot 186 and the respective control valve activators. Decoupler 192 disconnects the roll input (left-right stick movement) to louver control systems 201 and 203. Decoupler 196 disconnects pitch input (fore and aft stick movement) from the louver control systems 201, 202 and 203, and decoupler 194 disconnects yaw input from the control vane activator systems 204 and 206. In vertical flight, all louver and vane control systems are active.

Thus, operation of the left rudder pedal will cause the vane 49 to redirect some of the air entering the control propeller assembly 30, causing some of the air to have a small relatively forward component. At the same time, the control vane 51 will be caused to move in an equal and opposite direction, causing some of the air exiting from the control propeller assembly 52 to have an aft component. This will result in rotation of the aircraft about its vertical axis, or yaw. Operation of the stick 144 to the left will cause fore and aft horizontal deflection of some of the air existing the control propeller assembly 30 causing reduced vertical thrust and the aircraft to roll left. Operation of the stick 144 to the right has the same effect on control propeller assembly 32 and causes the aircraft to roll right. Forward movement of the stick 144 varies the amount of thrust on the primary propeller assembly 20, causing the aircraft to pitch down, and aft movement of the stick 144 varies the amount of thrust on the control propeller assemblies 30 and 32 causing the aircraft to pitch up.

In making the transition from vertical flight to horizontal, control 137 is moved to the forward position. Control 137 may be conveniently located on the left side of the cockpit so that it may be operated simultaneously with the stick control 144. When the control 137 is moved to the forward position the louvers are all positioned as shown in FIG. 3 and the decouplers 192, 194 and 196 activated so that further movements of the controls tick 144 and rudder pedals 184 will no longer cause movement of the valve operators 104.

The throttle 187 is active in vertical and horizontal flight modes to control the output of engine 11.

Having described my invention, I now claim:

1. An aircraft capable of vertical short takeoff or landing comprising:

a wing section having a chord;

a propulsion assembly, comprising at least one ducted propeller assembly incorporating at least one propeller having a hub, said propeller assembly being mounted in said wing section, said propeller having an axis of rotation generally perpendicular to the chord of said wing section to produce vertical thrust in the vertical takeoff mode;

an airfoil shaped fuselage having a chord and a lower edge, said fuselage bridging over said ducted propeller assembly, and wherein said chord of said fuselage intersects said ducted propeller assembly;

said hub of said propeller being mounted from the lower edge of said fuselage.

2. The aircraft of claim 1 wherein said wing section of claim 1 comprising the propulsion assembly to provide thrust and lift for said aircraft further comprises:

a pair of wing extensions mounted to said wing section at or behind center of gravity of said aircraft with the chord of the wings oriented at an approximately +22 degree angle from said propeller plane of rotation; and an aft extension of said wing section wherein said aft extension supports at least one vertical rudder and an elevator.

3. The fuselage of claim 1 wherein said fuselage bridges over the axis of said ducted propeller to maximize air flow over through said ducted propeller.

4. A yaw control for said aircraft of claim 1 in vertical flight comprising:

at least one yaw louver on at least one control ducted propeller assembly operable to redirect a portion of air flow exiting one control ducted propeller assemblies.

5. The fuselage of said aircraft in claim 1 further comprising:

a wing section;

a propulsion assembly comprising at least one ducted propeller assembly incorporating at least one propeller mounted for rotation in said wing section;

flight control means for commanding pitch, roll and yaw responses;

at least one set of louvers connected for redirecting air flow exiting said ducted propeller assemblies;

an elevator mounted with an aft offset from the center of lift of said wing section for producing pitch during horizontal flight;

a rudder mounted for producing yaw response during horizontal flight;

an aileron mounted for producing roll response during horizontal flight;

said flight control means being mounted for movement of said rudder aileron and elevator during both vertical, transition and horizontal flight;

said flight control means being connected for movement of said louvers on said propeller assemblies.

6. A propulsion assembly for a V/STOL aircraft, comprising:

at least one primary ducted propeller assembly for producing vertical and horizontal thrust;

at least one pair of control ducted propeller assemblies for producing thrust with vertical and horizontal components and for controlling vertical flight;

said control ducted propeller assemblies being spaced laterally from said primary ducted propeller assembly and spaced laterally from one another;

said control ducted propeller assemblies being positioned aft of said primary ducted propeller assembly;

said primary and control ducted propeller assemblies each comprising at least one propeller;

all said ducted propeller assemblies having a plurality of controllable louvers positioned for redirecting air flow exiting said ducted propeller assemblies;

said louvers of at least said primary ducted propeller assemblies being split into fore and aft louver groups, each group being independently operable to control thrust in vertical flight mode by redirecting part of air flow in one airframe-referenced, generally horizontal direction and part of said air flow in the opposite direction;

said fore and aft louver groups further operable together to redirect substantially all thrust from air flow in an aftward airframe-referenced, generally horizontal direction during horizontal flight; and at least a plurality of said louvers comprising a flexible portion, said plurality of louvers being operable by bending said flexible portion to redirect said air flow.

7. The propulsion assembly of claim 6 further comprising:

flight control means for commanding pitch, roll and yaw responses;

said louvers being controlled by a hydraulic valve for said primary ducted propeller assembly, and an independent hydraulic valve for each of said control ducted propeller assemblies;

each of said hydraulic valves being operable in response to movement of said flight control means for controlling the position of said louvers to redirect air flow exiting said ducted propeller assemblies for vertical, vertical-to-horizontal transition and horizontal flight thrust and for controlling at least the pitch and roll in the vertical flight mode.

8. A propulsion assembly for a V/STOL aircraft comprising:

at least one primary ducted propeller assembly for producing vertical and horizontal thrust;

at least one pair of control ducted propeller assemblies for producing thrust with vertical and horizontal components and for controlling vertical flight;

said control ducted propeller assemblies being spaced laterally from said primary ducted propeller assembly and spaced laterally from one another;

said control ducted propeller assemblies being positioned aft of said primary ducted propeller assembly;

said primary and control ducted propeller assemblies each comprising at least one propeller, each having an axis of rotation;

a drive gear surrounding each said ducted propeller assembly and having an axis of rotation co-axial with and connected to said propeller of said ducted propeller assembly;

each said drive gear of each control ducted propeller assembly meshing directly with said drive gear of said primary ducted propeller assembly;

at least one engine having an output shaft connected for driving only one of said drive gears whereby all propellers in all propeller assemblies are driven by said engine.

9. The propulsion assembly of claim 8, wherein:

each of said propellers has a plurality of blades; and said blades have fixed pitches and are rigidly connected to said drive gears at the outer ends of said propeller blades in each of said ducted propeller assemblies.

10. An aircraft capable of vertical/short takeoff and landing comprising:

a propulsion assembly, comprising at least one ducted propeller assembly incorporating a primary propeller assembly having an axle mounted for rotation centrally below an airfoil shaped fuselage section, said airfoil shaped fuselage section is bridging over the primary propeller assembly, where the axle of said primary propeller assembly is mounted to the bottom of said airfoil shaped fuselage section, said primary propeller assembly having a generally horizontal plane of rotation in a vertical take-off mode, and in a transition flight said aircraft tilts forward in its entirety to reach a horizontal flight mode, wherein said airfoil shaped fuselage section has a shape that allows unobstructed and smooth airflow through the primary ducted propeller assembly.

* * * * *